(12) United States Patent
Davydov et al.

(10) Patent No.: US 12,021,773 B2
(45) Date of Patent: Jun. 25, 2024

(54) BEAM MANAGEMENT FOR PARTIAL BEAM CORRESPONDENCE USER EQUIPMENT

(71) Applicant: Apple Inc., Cupertino, CA (US)

(72) Inventors: Alexei Davydov, Nizhny Novgorod (RU); Seunghee Han, San Jose, CA (US); Gang Xiong, Portland, OR (US); Guotong Wang, Beijing (CN); Bishwarup Mondal, San Ramon, CA (US); Daewon Lee, Portland, OR (US); Yushu Zhang, Beijing (CN); Yang Tang, San Jose, CA (US)

(73) Assignee: Apple Inc., Cupertino, CA (US)

( * ) Notice: Subject to any disclaimer, the term of this patent is extended or adjusted under 35 U.S.C. 154(b) by 414 days.

(21) Appl. No.: 17/292,312

(22) PCT Filed: Nov. 7, 2019

(86) PCT No.: PCT/US2019/060188
§ 371 (c)(1),
(2) Date: May 7, 2021

(87) PCT Pub. No.: WO2020/097280
PCT Pub. Date: May 14, 2020

(65) Prior Publication Data
US 2021/0399855 A1 Dec. 23, 2021

Related U.S. Application Data

(60) Provisional application No. 62/758,136, filed on Nov. 9, 2018.

(51) Int. Cl.
*H04W 56/00* (2009.01)
*H04L 5/00* (2006.01)

(52) U.S. Cl.
CPC ................... *H04L 5/0048* (2013.01)

(58) Field of Classification Search
CPC ....................................... H04L 5/0048
USPC ............................................. 370/329
See application file for complete search history.

(56) References Cited

U.S. PATENT DOCUMENTS

| 10,484,062 B2 | 11/2019 | Xiong et al. |
| 2018/0041260 A1 | 2/2018 | Seifi et al. |
| 2021/0159966 A1* | 5/2021 | Xi .................. H04B 7/088 |

FOREIGN PATENT DOCUMENTS

| CN | 107852705 A | 3/2018 |
| CN | 112166563 A | 1/2021 |
| WO | 2018144384 A1 | 8/2018 |
| WO | WO 2019/195528 A1 | 10/2019 |

OTHER PUBLICATIONS

Grossmann, Beam Correspondence Indication and Bitmap for Beam Reporting for Wireless Communications, WO 2020/0200453, Jan. 30, 2020 (Year: 2018).*

(Continued)

*Primary Examiner* — Sai Ming Chan
(74) *Attorney, Agent, or Firm* — Sterne, Kessler, Goldstein & Fox P.L.L.C.

(57) ABSTRACT

Embodiments of the present disclosure provide for uplink and downlink beam management for partial beam correspondence user equipments. Other embodiments may be described and claimed.

19 Claims, 7 Drawing Sheets

(56) References Cited

OTHER PUBLICATIONS

Extended European Search Report directed to related European Patent Application No. 19883002.8, dated Oct. 12, 2021; 10 pages.
Samsung, "Corrections on UL Beam Management", R1-1804362, 3GPP TSG RAN WG1 Meeting #92bis, Sanya, China, Apr. 6, 2018, 7 pages.
ZTE, "Enhancements on multi-beam operation", R1-1812257, 3GPP TSG RAN WG1 Meeting #95, Spokane, USA, Nov. 3, 2018, 11 pages.
3GPP; TSG RAN; NR; Physical layer procedures for data (Release 15), 3GPP TS 38.214 V15.3.0, Oct. 1, 2018, 99 pages.
Vivo, "Discussion on beam indication", R1-1712837, 3GPP TSG RAN WG1 Meeting #90, Prague, P.R. Czech, Aug. 12, 2017, 4 pages.
International Search Report and Written Opinion of the International Searching Authority directed to related International Patent Application No. PCT/US2019/060188, dated Apr. 9, 2020, 10 pages.
First Chinese Office Action and Search Report directed to related Chinese Application No. 201980073285.2, with English-language machine translation attached, issued Mar. 13, 2024; 24 pages.

\* cited by examiner

BEAM MANAGEMENT FOR PARTIAL BEAM CORRESPONDENCE USER EQUIPMENT

CROSS REFERENCE TO RELATED APPLICATION

The present application is a U.S. National Phase of the United States of PCT Application No. PCT/US2019/060188, filed on Nov. 7, 2019, which claims priority to U.S. Provisional Patent Application No. 62/758,136, filed Nov. 9, 2018, both of which are hereby incorporated by reference in their entireties.

FIELD

Embodiments of the present invention relate generally to the technical field of wireless communications.

BACKGROUND

Mobile communication has evolved significantly. The next generation wireless communication system, 5G, or new radio (NR) will provide access to information and sharing of data anywhere, anytime by various users and applications. NR is a unified network/system targeted to meet vastly different and sometime conflicting performance dimensions and services. Such diverse multi-dimensional requirements are driven by different services and applications. In general, NR will evolve based on 3GPP LTE-Advanced with additional potential new Radio Access Technologies (RATs) to enrich people lives with better, simple and seamless wireless connectivity solutions. NR will enable wireless connections to deliver fast, rich contents and services.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrases "A or B" and "A/B" mean (A), (B), or (A and B).

Figure 1:
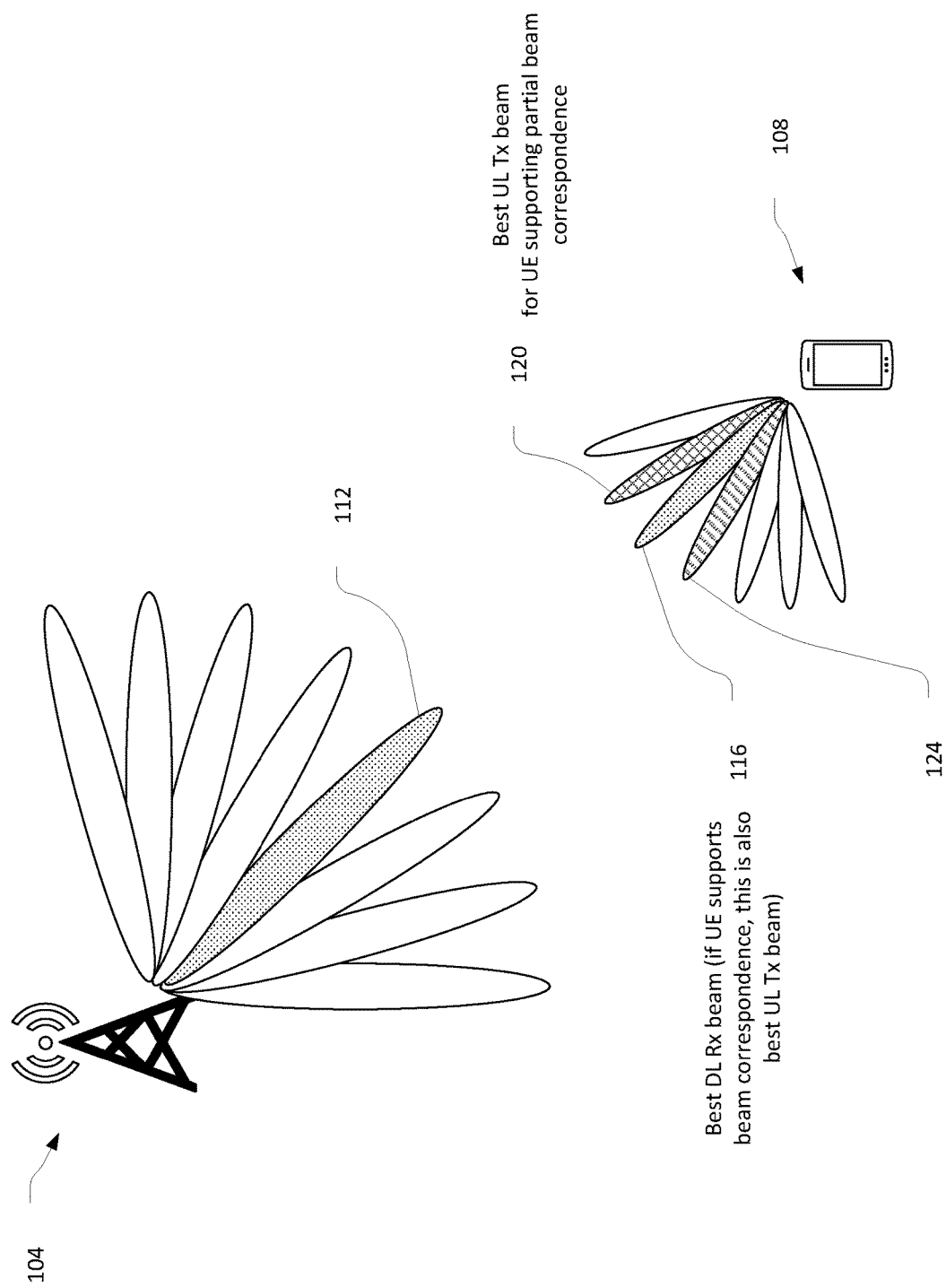
FIG. 1 illustrates a network in accordance with some embodiments.

FIG. 1 illustrates a network 100 in accordance with some embodiments. The network 100 may be a wireless radio access network that includes an access node 104 and a user equipment (UE) 108. The access node 104 and the UE 108 may be capable of uplink (UL) or downlink (DL) beamforming, which may be facilitated by uplink or downlink beam management.

Uplink beam management may involve the UE 108 using a spatial domain transmission filter (also referred to as a "transmit (Tx) beam") based on an indicated control or reference signal, for example, a sounding reference signal (SRS), channel state information-reference signal (CSI-RS), or synchronization signal block (SSB). Consider, for example, use of a CSI-RS/SSB. The access node 104 may transmit CSI-RS/SSB using beam 112 as the DL Tx beam. The UE 108 may measure the received CSI-RS/SSB using different spatial domain receive filters (also referred to as "receive (Rx) beams") and determine that the beam 112 is the best DL Rx beam for receiving the CSI-RS/SSB (determined, for example, based on some received quality metric).

If the UE 108 supports beam correspondence, the UE 108 may also use beam 116 as the best UL Tx beam. That is, the UE 108 may use the same spatial domain filter used by the access node 104 to transmit the CSI-RS/SSB through beam 112 in order to transmit an uplink signal to the access node 104 using beam 116. Beam correspondence, which may also be referred to as "full beam correspondence," may mean that a transmit beam and a receive beam could be the same for a channel.

However, in some embodiments, UE 108 may not support full beam correspondence, and only support partial beam correspondence. In various embodiments, the UE 108 may provide the access node 104 with an indication, for example, as part of a UE capability report, as to whether the UE 108 supports full or partial beam correspondence in accordance with some embodiments.

With partial beam correspondence, the best transmit beam and receive beam may be correlated rather than the same. For example, if the beam 116 is determined to be the best DL receive beam and the UE 108 only supports partial beam correspondence, the access node 104 may determine that beam 120, which is correlated with beam 116, is the best UL transmit beam.

A UE with partial beam correspondence may not be able to perfectly reproduce the best receive beam acquired in the downlink for an uplink transmission. Due to implementation errors there may be multiple candidate uplink beams that can be the best for the uplink. In this case, the UE 108 may transmit multiple SRS resources using the candidate uplink beams and the access node 104 may determine which one is the best for the uplink. The UE 108 may also know which candidate beams for uplink are correlated to acquired receive beamforming direction. In some embodiments, the UE 108 may be configured with the correlation information.

Various embodiments describe management of uplink beams for a UE that supports partial beam correspondence. The present disclosure provides embodiments that support uplink beam management for a UE with partial beam correspondence. Embodiments herein include mechanisms to maintain the same understanding between the UE 108 and access node 104 on beam management procedure, and mechanisms for using SRS for beam management. For example, some embodiments provide for a mutual understanding as to whether an SRS for beam management is used for UE-beam refinement or access node-beam refinement. Some embodiments describe reducing overhead and latency for downlink beam management by including an indication of an SRS in a transmission configuration indication (TCI). Another issue that arises is whether the UE 108, when SRS is indicated, should use the same beam to receive downlink signal or a refined (for example, correlated) beam.

Some embodiments describe UL beam management for partial beam correspondence UEs.

In an embodiment, the access node 104 and the UE 108 may maintain the same understanding on whether an SRS resource or SRS resource set for beam management is used for access node beam refinement or UE beam refinement. In some embodiments, the access node 104 may transmit, to the UE 108, an indication of a beam, in spatial relation information, to be used for SRS resources. If an SRS resource or SRS resource set is used for access node beam refinement, the UE 108 may use the beam indicated by the spatial relation information as a Tx beam to transmit the SRS resources in the SRS resource set; otherwise, the UE 108 can apply different beams in different SRS resources or symbols, which are correlated to the beam indicated by spatial relation information.

Figure 2:
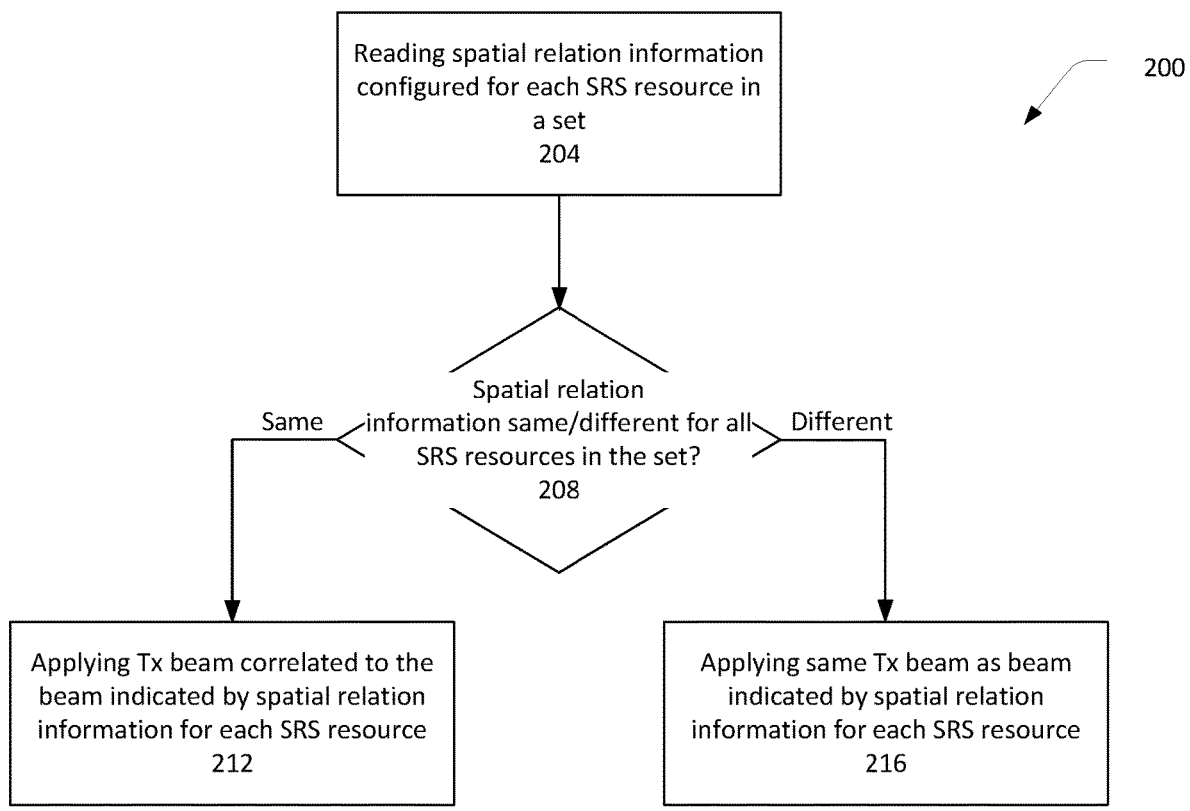
FIG. 2 illustrates an operation flow/algorithmic structure in accordance with some embodiments.

FIG. 2 illustrates an operation flow/algorithmic structure 200 in accordance with some embodiments. The operation flow/algorithmic structure 200 may be performed by the UE 108 or components thereof, for example, baseband circuitry.

The operation flow/algorithmic structure 200 may include, at 204, reading spatial relation information configured for each SRS resource in a SRS resource set. As used herein, an SRS resource may be a location, in time and frequency domain, of an SRS. Factors defining a location and bandwidth of an SRS, and concepts related to SRS resources and SRS resource sets, may be defined consistent with descriptions provided in Third Generation Partnership Project (3GPP) Technical Specification (TS) 38.211 v15.3.0 (2018 Sep. 27). The spatial relation information may be provided to the UE 108 from the access node 104. In some embodiments, the spatial relation information may be provided in higher-layer signaling such as, but not limited to, radio resource control (RRC) or MAC CE signaling.

The operation flow/algorithmic structure 200 may further include, at 208, determining whether spatial relation information is the same or different for all SRS resources in a set. In particular, it may be determined whether a spatial domain filter to be used for the SRS resources of the SRS resource set is the same/different.

The spatial domain filter may be the same as analog beamforming used by the UE. Based on the spatial relation information indicated by the access node 104, the UE 108 may determine a spatial filter/analog beamforming for uplink transmission. Thus, the signaled spatial relation information may define the spatial filter/analog beamforming of the UE 108. The spatial relation information signaling may include an identifier of reference signals used for analog beam acquisition.

If it is determined, at 208, that the spatial relation information is the same for all SRS resources in the set, the operation flow/algorithmic structure 200 may advance to applying a transmit beams for SRS resources correlated to the beam indicated by spatial relation information for each SRS resource at 212. Consider, for example, that a SRS resource set includes SRS resource #0 and #1. If spatial relation information configures both SRS resources #0 and #1 with spatial domain filter #0 (which corresponds to beam 116 of FIG. 1, for example), the UE 108 may determine that spatial domain filter #1 (which corresponds to beam 120 of FIG. 1, for example), which is correlated with spatial domain filter #0, should be used for transmission of the SRS resources #0 and #1.

In some embodiments, the UE 108 may use different beams for the SRS resources if the different beams are correlated with the indicated beam. For example, if spatial domain filter #2, which corresponds to beam 124 of FIG. 1, for example, is also correlated with spatial domain filter #0, it may be that the UE 108 uses spatial domain filter #1 for transmitting SRS resource #0 and uses spatial domain filter #2 for transmitting SRS resource #1.

If it is determined, at 208, that the spatial relation information is different for all SRS resources in the set, the operation flow/algorithmic structure 200 may advance to applying the same transmit beam indicated by spatial relation information for each SRS resource of the set at 216. For example, assuming the SRS resource set includes SRS resources #0-#1, as discussed above, and spatial relation information configures SRS resource #0 with spatial domain filter #0 and configures SRS resource #1 with spatial domain filter #1, then the UE 108 may determine that spatial domain filter #0 should be used for transmission of SRS resource #0 and spatial domain filter #1 should be used for transmission of SRS resource #1.

The operation flow/algorithmic structure 200 may be premised on an assumption that the UE 108 expects all SRS resources in a set to be configured with the same spatial relation information or different spatial relation information. However, in some embodiments, spatial relation information may be the same only for a subset of the SRS resources of the set. In these embodiments, the UE may apply the same Tx beams as indicated by spatial relation information to SRS resources having different spatial relation information and may apply correlated Tx beams to the SRS resources of the subset having the same spatial relation information.

Alternatively, if the spatial relation information is the same only for a subset of SRS resources of the set, the UE 108 may apply Tx beams correlated to the beams indicated by spatial relation info for all the SRS resources of the set. Consider, for example, SRS resources #0-#3 being configured with spatial domain filter #0; and SRS resource #4 being configured with spatial domain filter #2. In this case, SRS resources #0-#3 may each be configured with spatial domain filter #1, which is correlated with spatial domain filter #0, and SRS resource #4 may be configured with spatial domain filter #3, which is correlated with spatial domain filter #2.

In some embodiments, the operation flow/algorithmic structure 200 may be applied to SRS for beam management, codebook or non-codebook beam management, or antenna switching. Furthermore, in some embodiments, the operation flow/algorithmic structure 200 may be applied to beam management using periodic, semi-persistent, or periodic SRS.

Some embodiments describe downlink beam management for partial beam correspondence UEs.

Figure 3:
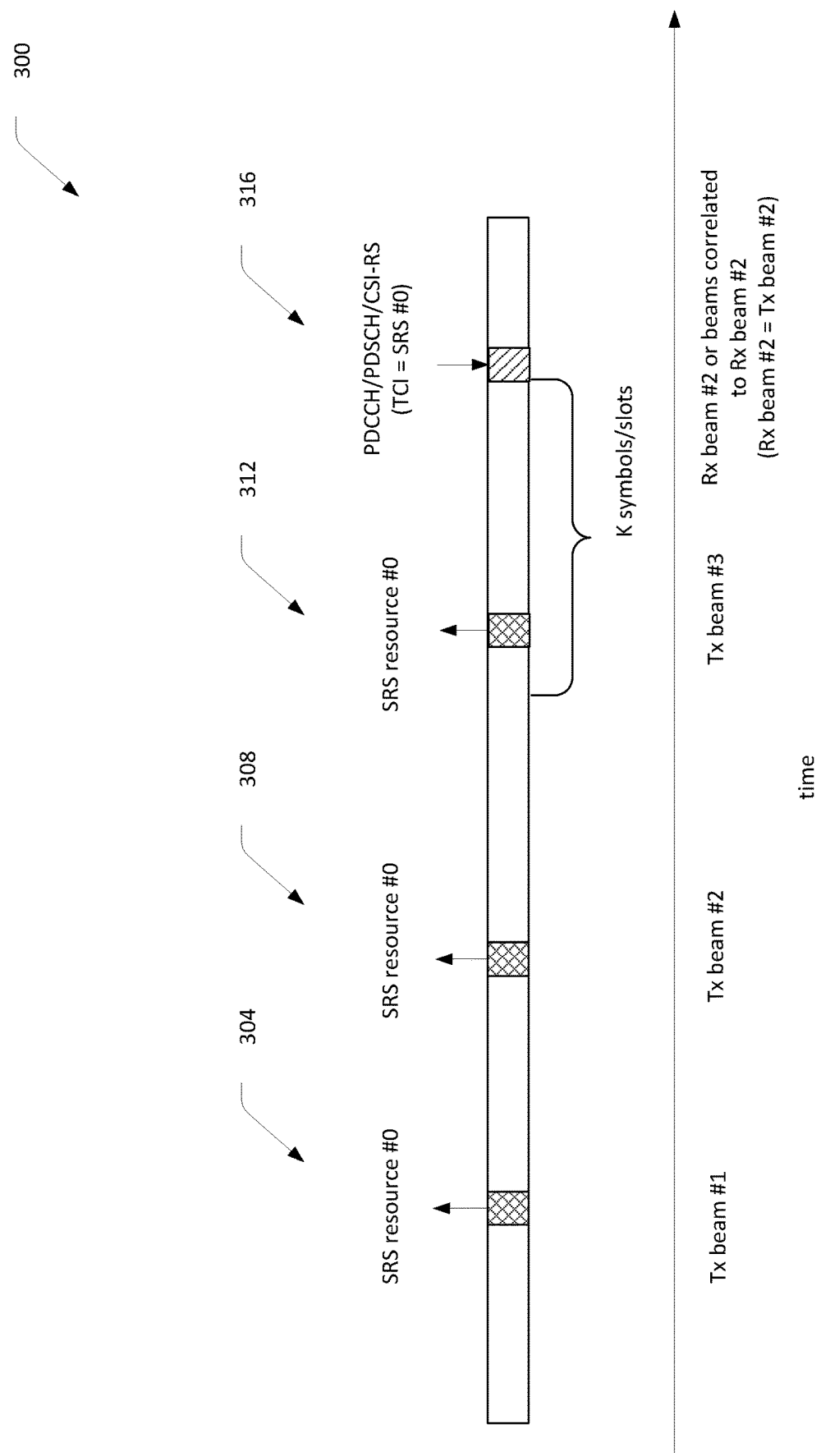
FIG. 3 is a timing diagram in accordance with some embodiments.

In some embodiments, an SRS may be indicated in a transmission configuration indication (TCI) state configured or indicated by control signaling (for example, downlink control information (DCI), RRC, MAC CE, etc.) for receipt of a downlink signal such as, but not limited to, and CSI-RS, PDCCH, or PDSCH. FIG. 3 includes a timing diagram 300 to illustrate an example for timing on an SRS-based TCI indication in accordance with some embodiments.

The UE 108 may sequentially transmit, at 304, 308, and 312, SRS resource #0 using a plurality of spatial domain filters (corresponding to transmit beams #1, #2, and #3). At 316, the access node 104 may transmit control signaling for receiving a downlink signal (for example, PDCCH/PDSCH/CSI-RS). The control signaling may have or otherwise configure a TCI state that indicates SRS resource #0. In some embodiments, the TCI state may indicate a specific transmission of the SRS resource #0 as being the latest transmission of SRS resource #0 at least K slots/symbols before reception of the downlink signal. In some embodiments, K may be an integer based on a UE capability. In this manner, the TCI state may also provide an indication of the transmit beam #2.

In a first option, the UE 108 may use a receive beam that is correlated to the indicated transmit beam, or a receive beam indicated by spatial relation information for SRS when spatial relation information is based on a downlink reference signal. For example, if beam #4 is correlated with beam #2, the UE 108 may use receive beam #4 to receive downlink transmissions from the access node 104. For another example, consider that an SSB or CSI-RS with some ID (for example, ID=#1) is configured as a source reference signal in spatial relation information of an SRS resource with some ID (for example, ID=#2). Such spatial relation may be used by the UE 108 as a reference transmit beam for SRS transmission with local beam sweeping around a beam acquired from downlink based on the SSB or CSI-RS with that ID. If this SRS resource is also configured in a TCI state for another downlink signal (for example, PDCCH/PDSCH), then the QCL type D information (for example, receive beamforming at the UE) for that DL signal (for example, PDCCH/PDSCH) reception would be determined directly by SSB or CSI-RS with that ID.

In a second option, the UE 108 may use the same receive beam as the indicated Tx beam. For example, the UE 108 may use receive beam #2, which is equal to transmit beam #2.

In some embodiments, whether the UE 108 should use the first or second option may be predefined or determined by corresponding downlink signal type or configuration for downlink signal. For example, in one embodiment if CSI-RS with repetition=ON, the first option should be used, and for other cases, the second option should be used.

Figure 4:
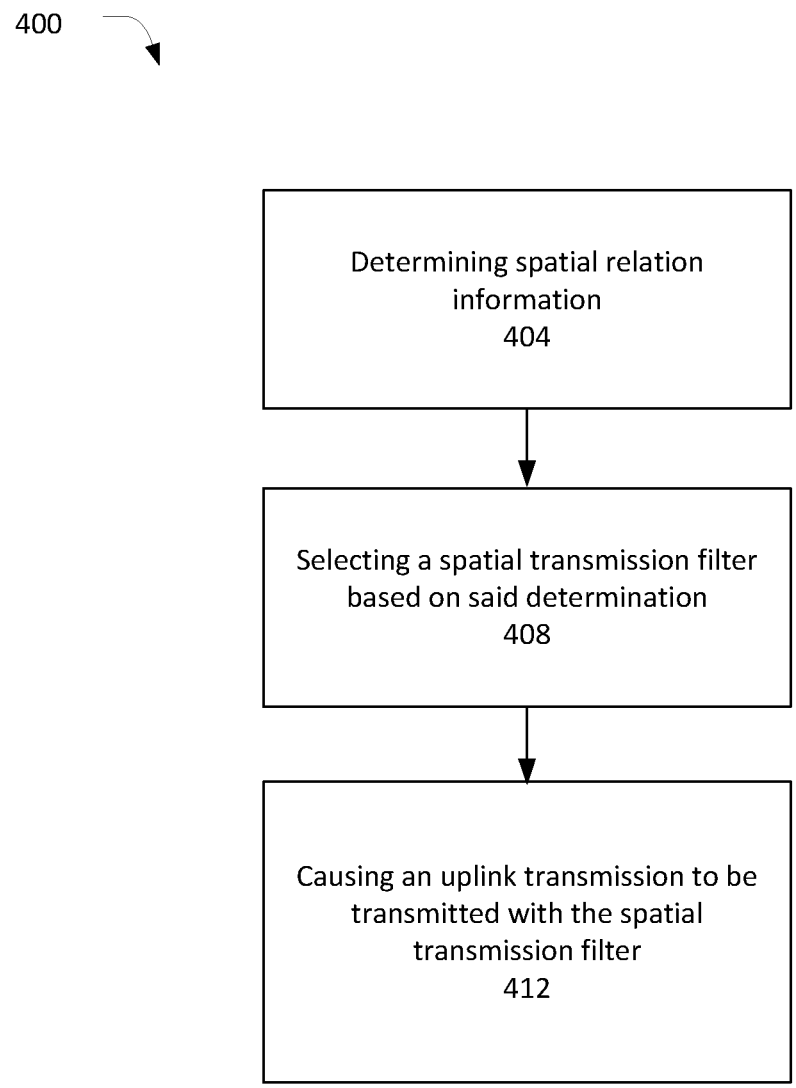
FIG. 4 illustrates an operation flow/algorithmic structure in accordance with some embodiments.

FIG. 4 illustrates an operation flow/algorithmic structure 400 in accordance with some embodiments. The operation flow/algorithmic structure 400 may be performed by UE 108 or components thereof, for example, baseband circuitry within the UE 108.

The operation flow/algorithmic structure 400 may include, at 404, determining spatial relation information. The spatial relation information may correspond to CSI resources of a CSI resource set. In some embodiments, the spatial relation information may include a spatial domain filter for each of the CSI resources of the CSI resource set. In some embodiments, the spatial relation information may be provided to the UE 108 by one or more configuration messages from the access node 104.

The operation flow/algorithmic structure 400 may further include, at 408, selecting a spatial transmission filter based on determination of the spatial relation information. In some embodiments, the spatial transmission filter for an SRS resource may be the spatial relation information indicated for the SRS resource. In other embodiments, the spatial transmission filter for the SRS resource may be correlated with the spatial relation information indicated for the SRS resource. Selection of the spatial transmission filter based on determining the spatial relation information may be similar to that described above with respect to FIG. 2.

The operation flow/algorithmic structure 400 may further include, at 412, causing an uplink transmission to be transmitted with the spatial transmission filter selected at 408. In some embodiments, the uplink transmission may be, for example, a physical uplink control channel transmission, a physical uplink shared channel transmission, etc.

Figure 5:
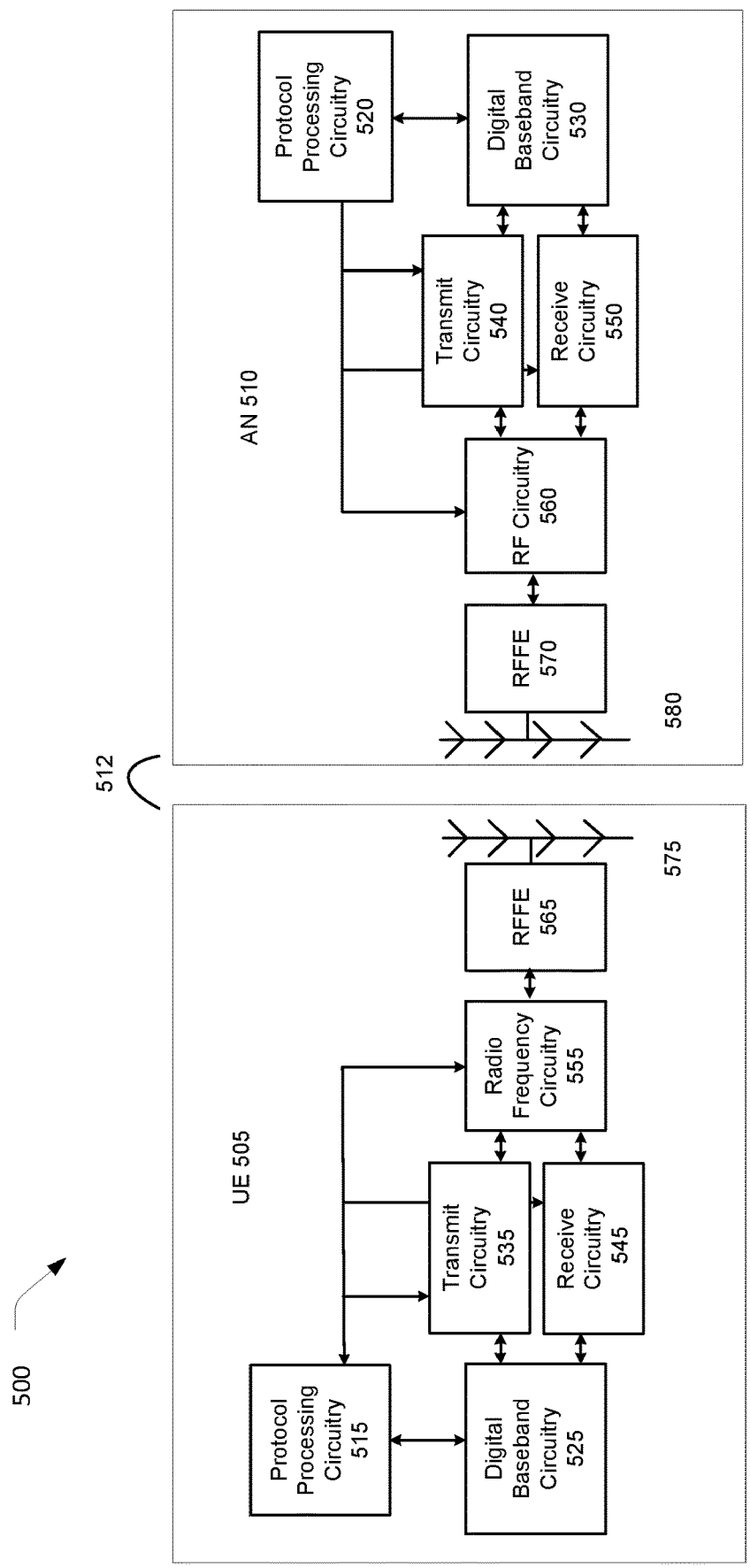
FIG. 5 schematically illustrates an example wireless network in accordance with various embodiments herein.

FIG. 5 schematically illustrates an example wireless network 500 (hereinafter "network 100") in accordance with various embodiments herein. The network 500 may include a UE 505 in wireless communication with an AN 510. UE 505 and AN 510 may be similar to, and substantially interchangeable with, UE 108 and access node 104, respectively.

In some embodiments, the network 500 may be an NR or LTE network. The UE 505 may be configured to connect, for example, to be communicatively coupled, with the AN 510 via connection 512. In this example, the connection 512 is illustrated as an air interface to enable communicative coupling, and can be consistent with cellular communications protocols such as an LTE protocol, a 5G NR protocol operating at mmWave and sub-6 GHz, a Global System for Mobile Communications (GSM) protocol, a code-division multiple access (CDMA) network protocol, a Push-to-Talk (PTT) protocol, and the like.

The UE 505 is illustrated as a smartphone (for example, a handheld touchscreen mobile computing device connectable to one or more cellular networks), but may also comprise any mobile or non-mobile computing devices, such as a Personal Data Assistant (PDA), pager, laptop computer, desktop computer, wireless handset, customer premises equipment (CPE), fixed wireless access (FWA) device, vehicle mounted UE or any computing device including a wireless communications interface. In some embodiments, the UE 505 can comprise an Internet of Things (IoT) UE, which can comprise a network access layer designed for low-power IoT applications utilizing short-lived UE connections. An IoT UE can utilize technologies such as narrowband IoT (NB-IoT), machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An NB-IoT/MTC network describes interconnecting NB-IoT/MTC UEs, which may include uniquely identifiable embedded computing devices (within the Internet infrastructure), with short-lived connections. The NB-IoT/MTC UEs may execute background applications (for example, keep-alive message, status updates, location related services, etc.).

The AN 510 can enable or terminate the connection 512. The AN 510 can be referred to as a base station (BS), NodeB, evolved-NodeB (eNB), Next-Generation NodeB (gNB or ng-gNB), NG-RAN node, cell, serving cell, neighbor cell, and so forth, and can comprise ground stations (for example, terrestrial access points) or satellite stations providing coverage within a geographic area.

The AN 510 can be the first point of contact for the UE 505. In some embodiments, the AN 510 can fulfill various logical functions including, but not limited to, radio network controller (RNC) functions such as radio bearer management, uplink and downlink dynamic radio resource management and data packet scheduling, and mobility management.

The UE 505 may include protocol processing circuitry 515, which may implement one or more of layer operations related to medium access control (MAC), radio link control (RLC), packet data convergence protocol (PDCP), radio resource control (RRC) and non-access stratum (NAS). The protocol processing circuitry 515 may include one or more processing cores (not shown) to execute instructions and one or more memory structures (not shown) to store program and data information.

The UE 505 may further include digital baseband circuitry 525, which may implement physical layer (PHY) functions including one or more of hybrid automatic repeat request-acknowledgment (HARQ-ACK) functions, scrambling and/or descrambling, coding and/or decoding, layer mapping and/or de-mapping, modulation symbol mapping, received symbol and/or bit metric determination, multi-antenna port pre-coding and/or decoding, which may include one or more of space-time, space-frequency or spatial coding, reference signal generation and/or detection, preamble sequence generation and/or decoding, synchronization sequence generation and/or detection, control channel signal blind decoding, and other related functions.

The UE 505 may further include transmit circuitry 535, receive circuitry 545, radio frequency (RF) circuitry 555, and RF front end (RFFE) 565, which may include or connect to one or more antenna panels 575.

As used herein, the term "circuitry" may refer to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable System on Chip (SoC)), digital signal processors (DSPs), etc., that are configured to provide the described functionality. In some embodiments, the circuitry may execute one or more software or firmware programs to provide at least some of the described functionality. In addition, the term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

In some embodiments, RF circuitry 555 may include multiple parallel RF chains or branches for one or more of transmit or receive functions; each chain or branch may be coupled with one antenna panel 575.

In some embodiments, the protocol processing circuitry 515 may include one or more instances of control circuitry (not shown) to provide control functions for the digital baseband circuitry 525 (or simply, "baseband circuitry 525"), transmit circuitry 535, receive circuitry 545, radio frequency circuitry 555, RFFE 565, and one or more antenna panels 575.

A UE reception may be established by and via the one or more antenna panels 575, RFFE 565, RF circuitry 555, receive circuitry 545, digital baseband circuitry 525, and protocol processing circuitry 515. The one or more antenna panels 575 may receive a transmission from the AN 510 by receive-beamforming signals received by a plurality of antennas/antenna elements of the one or more antenna panels 575.

The transmission from the AN 510 may be transmit-beamformed by antennas of the AN 110. In some embodiments, the baseband circuitry 525 may contain both the transmit circuitry 135 and the receive circuitry 545. In other embodiments, the baseband circuitry 525 may be implemented in separate chips or modules, for example, one chip including the transmit circuitry 135 and another chip including the receive circuitry 545.

Similar to the UE 505, the AN 510 may include protocol processing circuitry 520, digital baseband circuitry 530 (or simply, "baseband circuitry 530"), transmit circuitry 540, receive circuitry 550, RF circuitry 560, RFFE 570, and one or more antenna panels 580.

A cell transmission may be established by and via the protocol processing circuitry 520, digital baseband circuitry 530, transmit circuitry 540, RF circuitry 560, RFFE 570, and one or more antenna panels 580. The transmission components of the UE 505 may apply a spatial filter to the data to be transmitted to form a transmit beam emitted by the antenna elements of the one or more antenna panels 580.

In some embodiments, the UE 505 and AN 510 may include beamforming circuitry disposed in respective transmit/receive circuitries, RF circuitries, or RFFEs that may be used to manage and transmit/receive beamformed communications as described herein.

Beam management refers to a set of L1/L2 procedures to acquire and maintain a set of transmission/reception point(s) (TRP or TRxP) and/or UE beams that can be used for DL and UL transmission/reception. Beam management includes various operations or procedures, such as beam determination, beam management, beam reporting, and beam sweeping operations/procedures. Beam determination refers to TRxP(s) or UE ability to select of its own Tx/Rx beam(s). Beam measurement refers to TRP or UE ability to measure characteristics of received beamformed signals. Beam reporting refers the UE ability to report information of beamformed signal(s) based on beam measurement. Beam sweeping refers to operation(s) of covering a spatial area, with beams transmitted and/or received during a time interval in a predetermined manner.

Tx/Rx beam correspondence at a TRxP holds if at least one of the following conditions are satisfied: TRxP is able to determine a TRxP Rx beam for the uplink reception based on UE's downlink measurement on TRxP's one or more Tx beams; and TRxP is able to determine a TRxP Tx beam for the downlink transmission based on TRxP's uplink measurement on TRxP's one or more Rx beams. Tx/Rx beam correspondence at a UE holds if at least one of the following is satisfied: UE is able to determine a UE Tx beam for the uplink transmission based on UE's downlink measurement on UE's one or more Rx beams; UE is able to determine a UE Rx beam for the downlink reception based on TRxP's indication based on uplink measurement on UE's one or more Tx beams; and Capability indication of UE beam correspondence related information to TRxP is supported.

In some implementations, DL beam management includes procedures P-1, P-2, and P-3. Procedure P-1 is used to enable UE measurement on different TRxP Tx beams to support selection of TRxP Tx beams/UE Rx beam(s). For beamforming at TRxP, procedure P-1 typically includes a intra/inter-TRxP Tx beam sweep from a set of different beams. For beamforming at the UE, procedure P-1 typically includes a UE Rx beam sweep from a set of different beams.

Procedure P-2 is used to enable UE measurement on different TRxP Tx beams to possibly change inter/intra-TRxP Tx beam(s). Procedure P-2 may be a special case of procedure P-1 wherein procedure P-2 is used for a possibly smaller set of beams for beam refinement than procedure P-1. Procedure P-3 is used to enable UE measurement on the same TRxP Tx beam to change UE Rx beam in the case UE uses beamforming. Procedures P-1, P-2, and P-3 may be used for aperiodic beam reporting.

UE measurements based on RS for beam management (at least CSI-RS) is composed of K beams (where K is a total number of configured beams), and the UE reports measurement results of N selected Tx beams (where N may or may not be a fixed number). The procedure based on RS for mobility purpose is not precluded. Beam information that is to be reported includes measurement quantities for the N beam(s) and information indicating N DL Tx beam(s), if N<K. Other information or data may be included in or with the beam information. When a UE is configured with K'>1 non-zero power (NZP) CSI-RS resources, a UE can report N' CSI-RS Resource Indicator (CRIs).

The UE can trigger a mechanism to recover from beam failure, which is referred to a "beam recovery", "beam failure recovery request procedure", and/or the like. A beam failure event may occur when the quality of beam pair link(s) of an associated control channel falls below a threshold, when a time-out of an associated timer occurs, or the like. The beam recovery mechanism is triggered when beam failure occurs. The network may explicitly configure the UE with resources for UL transmission of signals for recovery purposes. Configurations of resources are supported where the base station (e.g., a TRP, gNB, or the like) is listening from all or partial directions (e.g., a random access region). The UL transmission/resources to report beam failure can be located in the same time instance as a Physical Random Access Channel (PRACH) or resources orthogonal to PRACH resources, or at a time instance (configurable for a UE) different from PRACH. Transmission of DL signal is supported for allowing the UE to monitor the beams for identifying new potential beams.

For beam failure recovery, a beam failure may be declared if one, multiple, or all serving PDCCH beams fail. The beam failure recovery request procedure is initiated when a beam failure is declared. For example, the beam failure recovery request procedure may be used for indicating to a serving gNB (or TRP) of a new SSB or CSI-RS when beam failure is detected on a serving SSB(s)/CSI-RS(s). A beam failure may be detected by the lower layers and indicated to a Media Access Control (MAC) entity of the UE.

Beam management also includes providing or not providing beam-related indications. When beam-related indication is provided, information pertaining to UE-side beamforming/receiving procedure used for CSI-RS-based measurement can be indicated through QCL to the UE. The same or different beams on the control channel and the corresponding data channel transmissions may be supported.

DL beam indications are based on a Transmission Configuration Indication (TCI) state(s). The TCI state(s) are indicated in a TCI list that is configured by radio resource control (RRC) and/or Media Access Control (MAC) Control Element (CE).

Figure 6:
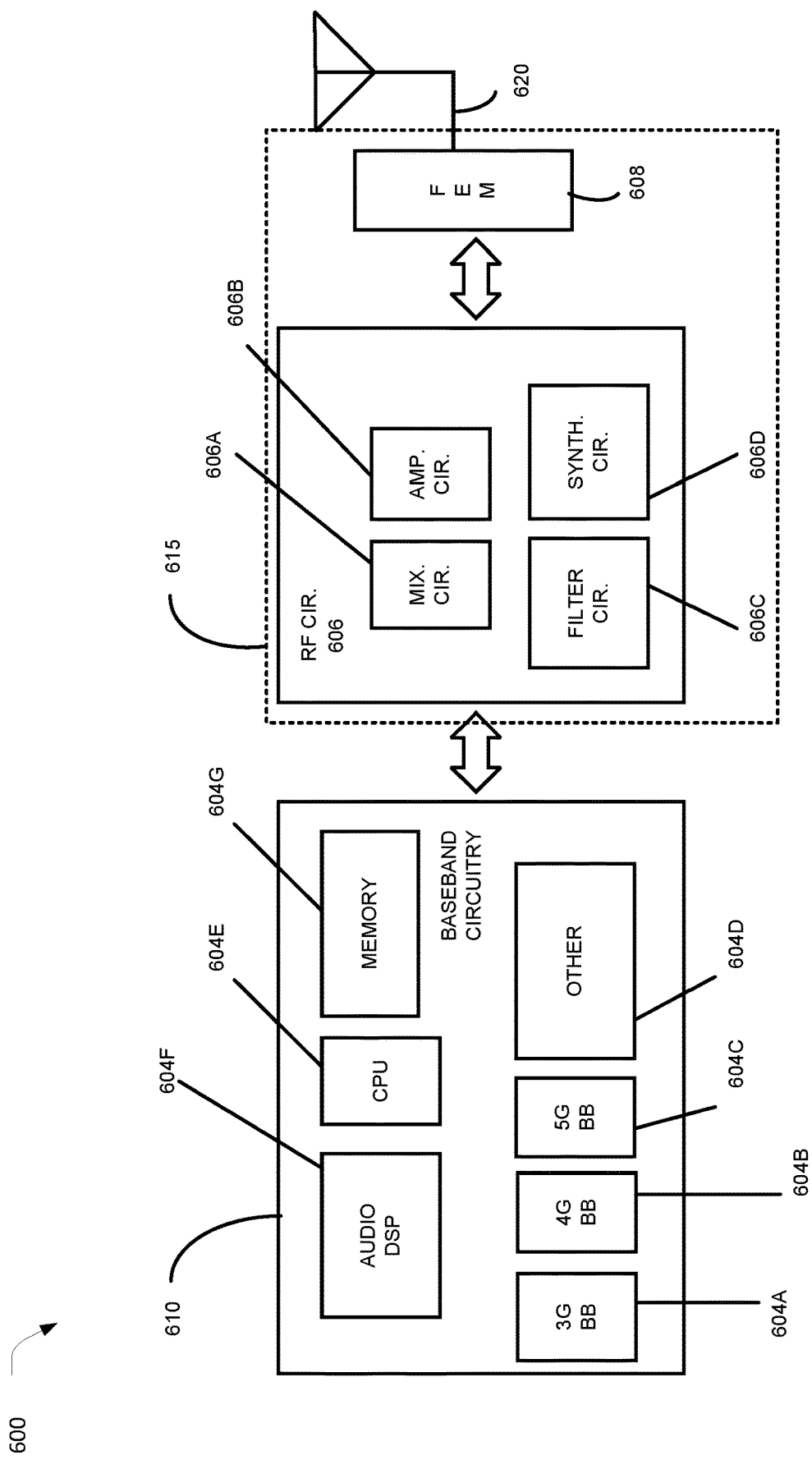
FIG. 6 illustrates example components of baseband circuitry and radio front end modules (RFEM) in accordance with various embodiments.

FIG. 6 illustrates example components of baseband circuitry 610 and radio front end modules (RFEM) 615 in accordance with various embodiments. The baseband circuitry 610 may correspond to protocol processing circuitries or digital baseband circuitries described in FIG. 5. The RFEM 615 corresponds to the radio frequency circuitries or RFEEs of FIG. 5. As shown, the RFEMs 615 may include Radio Frequency (RF) circuitry 606, front-end module (FEM) circuitry 608, antenna array 611 coupled together at least as shown.

The baseband circuitry 610 includes circuitry and/or control logic configured to carry out various radio/network protocol and radio control functions that enable communication with one or more radio networks via the RF circuitry 606. The radio control functions may include, but are not limited to, signal modulation/demodulation, encoding/decoding, radio frequency shifting, etc. In some embodiments, modulation/demodulation circuitry of the baseband circuitry 610 may include Fast-Fourier Transform (FFT), precoding, or constellation mapping/demapping functionality. In some embodiments, encoding/decoding circuitry of the baseband circuitry 610 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments. The baseband circuitry 610 is configured to process baseband signals received from a receive signal path of the RF circuitry 606 and to generate baseband signals for a transmit signal path of the RF circuitry 606. The baseband circuitry 610 is configured to interface with application circuitry for generation and processing of the baseband signals and for controlling operations of the RF circuitry 606. The baseband circuitry 610 may handle various radio control functions.

The aforementioned circuitry and/or control logic of the baseband circuitry 610 may include one or more single or multi-core processors. For example, the one or more processors may include a 3G baseband processor 604A, a 4G/LTE baseband processor 604B, a 5G/NR baseband processor 604C, or some other baseband processor(s) 604D for other existing generations, generations in development or to be developed in the future (e.g., si 6h generation (6G), etc.). In other embodiments, some or all of the functionality of baseband processors 604A-D may be included in modules stored in the memory 604G and executed via a Central Processing Unit (CPU) 604E. In other embodiments, some or all of the functionality of baseband processors 604A-D may be provided as hardware accelerators (e.g., FPGAs, ASICs, etc.) loaded with the appropriate bit streams or logic blocks stored in respective memory cells. In various embodiments, the memory 604G may store program code of a real-time OS (RTOS), which when executed by the CPU 604E (or other baseband processor), is to cause the CPU 604E (or other baseband processor) to manage resources of the baseband circuitry 610, schedule tasks, etc. In addition, the baseband circuitry 610 includes one or more audio digital signal processor(s) (DSP) 604F. The audio DSP(s) 604F include elements for compression/decompression and echo cancellation and may include other suitable processing elements in other embodiments.

In some embodiments, each of the processors 604A-604E include respective memory interfaces to send/receive data to/from the memory 604G. The baseband circuitry 610 may further include one or more interfaces to communicatively couple to other circuitries/devices, such as an interface to send/receive data to/from memory e 6ernal to the baseband circuitry 610; an application circuitry interface to send/receive data to/from the application circuitry XS105/XS205 of FIGS. XS1-6); an RF circuitry interface to send/receive data to/from RF circuitry 606 of FIG. 6; a wireless hardware connectivity interface to send/receive data to/from one or more wireless hardware elements (e.g., Near Field Communication (NFC) components, Bluetooth®/Bluetooth® Low Energy components, Wi-Fi® components, and/or the like); and a power management interface to send/receive power or control signals to/from the PMIC XS225.

In alternate embodiments (which may be combined with the above described embodiments), baseband circuitry 610 comprises one or more digital baseband systems, which are coupled with one another via an interconnect subsystem and to a CPU subsystem, an audio subsystem, and an interface subsystem. The digital baseband subsystems may also be coupled to a digital baseband interface and a mixed-signal baseband subsystem via another interconnect subsystem. Each of the interconnect subsystems may include a bus system, point-to-point connections, network-on-chip (NOC) structures, and/or some other suitable bus or interconnect technology, such as those discussed herein. The audio subsystem may include DSP circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry 610 may include protocol processing circuitry with one or more instances of control circuitry (not shown) to provide control functions for the digital baseband circuitry and/or radio frequency circuitry (e.g., the radio front end modules 615).

Although not shown by FIG. 6, in some embodiments, the baseband circuitry 610 includes individual processing device(s) to operate one or more wireless communication protocols (e.g., a "multi-protocol baseband processor" or "protocol processing circuitry") and individual processing device(s) to implement PHY layer functions. In these embodiments, the PHY layer functions include the aforementioned radio control functions. In these embodiments, the protocol processing circuitry operates or implements various protocol layers/entities of one or more wireless communication protocols. In a first example, the protocol processing circuitry may operate LTE protocol entities and/or 5G/NR protocol entities when the baseband circuitry 610 and/or RF circuitry 606 are part of mmWave communication circuitry or some other suitable cellular communication circuitry. In the first example, the protocol processing circuitry would operate MAC, RLC, PDCP, SDAP, RRC, and NAS functions. In a second example, the protocol processing circuitry may operate one or more IEEE-based protocols when the baseband circuitry 610 and/or RF circuitry 606 are part of a Wi-Fi communication system. In the second example, the protocol processing circuitry would operate Wi-Fi MAC and logical link control (LLC) functions. The protocol processing circuitry may include one or more memory structures (e.g., 604G) to store program code and data for operating the protocol functions, as well as one or more processing cores to execute the program code and perform various operations using the data. The baseband circuitry 610 may also support radio communications for more than one wireless protocol.

The various hardware elements of the baseband circuitry 610 discussed herein may be implemented, for example, as a solder-down substrate including one or more integrated circuits (ICs), a single packaged IC soldered to a main circuit board or a multi-chip module containing two or more ICs. In one example, the components of the baseband circuitry 610 may be suitably combined in a single chip or chipset, or disposed on a same circuit board. In another example, some or all of the constituent components of the baseband circuitry 610 and RF circuitry 606 may be implemented together such as, for example, a system on a chip (SoC) or System-in-Package (SiP). In another example, some or all of the constituent components of the baseband circuitry 610 may be implemented as a separate SoC that is communicatively coupled with and RF circuitry 606 (or multiple instances of RF circuitry 606). In yet another example, some or all of the constituent components of the baseband circuitry 610 and the application circuitry XS105/XS205 may be implemented together as individual SoCs mounted to a same circuit board (e.g., a "multi-chip package").

In some embodiments, the baseband circuitry 610 may provide for communication compatible with one or more radio technologies. For example, in some embodiments, the baseband circuitry 610 may support communication with an E-UTRAN or other WMAN, a WLAN, a WPAN. Embodiments in which the baseband circuitry 610 is configured to support radio communications of more than one wireless protocol may be referred to as multi-mode baseband circuitry.

RF circuitry 606 may enable communication with wireless networks using modulated electromagnetic radiation through a non-solid medium. In various embodiments, the RF circuitry 606 may include switches, filters, amplifiers, etc. to facilitate the communication with the wireless network. RF circuitry 606 may include a receive signal path, which may include circuitry to down-convert RF signals received from the FEM circuitry 608 and provide baseband signals to the baseband circuitry 610. RF circuitry 606 may also include a transmit signal path, which may include circuitry to up-convert baseband signals provided by the baseband circuitry 610 and provide RF output signals to the FEM circuitry 608 for transmission.

In some embodiments, the receive signal path of the RF circuitry 606 may include mixer circuitry 606a, amplifier circuitry 606b and filter circuitry 606c. In some embodiments, the transmit signal path of the RF circuitry 606 may include filter circuitry 606c and mixer circuitry 606a. RF circuitry 606 may also include synthesizer circuitry 606d for synthesizing a frequency for use by the mixer circuitry 606a of the receive signal path and the transmit signal path. In some embodiments, the mixer circuitry 606a of the receive signal path may be configured to down-convert RF signals received from the FEM circuitry 608 based on the synthesized frequency provided by synthesizer circuitry 606d. The amplifier circuitry 606b may be configured to amplify the down-converted signals and the filter circuitry 606c may be a low-pass filter (LPF) or band-pass filter (BPF) configured to remove unwanted signals from the down-converted signals to generate output baseband signals. Output baseband signals may be provided to the baseband circuitry 610 for further processing. In some embodiments, the output baseband signals may be zero-frequency baseband signals, although this is not a requirement. In some embodiments, mixer circuitry 606a of the receive signal path may comprise passive mixers, although the scope of the embodiments is not limited in this respect.

In some embodiments, the mixer circuitry 606a of the transmit signal path may be configured to up-convert input baseband signals based on the synthesized frequency provided by the synthesizer circuitry 606d to generate RF output signals for the FEM circuitry 608. The baseband signals may be provided by the baseband circuitry 610 and may be filtered by filter circuitry 606c.

In some embodiments, the mixer circuitry 606a of the receive signal path and the mixer circuitry 606a of the transmit signal path may include two or more mixers and may be arranged for quadrature downconversion and upconversion, respectively. In some embodiments, the mixer circuitry 606a of the receive signal path and the mixer circuitry 606a of the transmit signal path may include two or more mixers and may be arranged for image rejection (e.g., Hartley image rejection). In some embodiments, the mixer circuitry 606a of the receive signal path and the mixer circuitry 606a of the transmit signal path may be arranged for direct downconversion and direct upconversion, respectively. In some embodiments, the mixer circuitry 606a of the receive signal path and the mixer circuitry 606a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 606 may include analog-to-digital converter (ADC) and digital-to-analog converter (DAC) circuitry and the baseband circuitry 610 may include a digital baseband interface to communicate with the RF circuitry 606.

In some dual-mode embodiments, a separate radio IC circuitry may be provided for processing signals for each spectrum, although the scope of the embodiments is not limited in this respect.

In some embodiments, the synthesizer circuitry 606d may be a fractional-N synthesizer or a fractional N/N+1 synthesizer, although the scope of the embodiments is not limited in this respect as other types of frequency synthesizers may be suitable. For example, synthesizer circuitry 606d may be a delta-sigma synthesizer, a frequency multiplier, or a synthesizer comprising a phase-locked loop with a frequency divider.

The synthesizer circuitry 606d may be configured to synthesize an output frequency for use by the mixer circuitry 606a of the RF circuitry 606 based on a frequency input and a divider control input. In some embodiments, the synthesizer circuitry 606d may be a fractional N/N+1 synthesizer.

In some embodiments, frequency input may be provided by a voltage controlled oscillator (VCO), although that is not a requirement. Divider control input may be provided by either the baseband circuitry 610 or the application circuitry XS105/XS205 depending on the desired output frequency. In some embodiments, a divider control input (e.g., N) may be determined from a look-up table based on a channel indicated by the application circuitry XS105/XS205.

Synthesizer circuitry 606d of the RF circuitry 606 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 606d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 606 may include an IQ/polar converter.

FEM circuitry 608 may include a receive signal path, which may include circuitry configured to operate on RF signals received from antenna array 611, amplify the received signals and provide the amplified versions of the received signals to the RF circuitry 606 for further processing. FEM circuitry 608 may also include a transmit signal path, which may include circuitry configured to amplify signals for transmission provided by the RF circuitry 606 for transmission by one or more of antenna elements of antenna array 611. In various embodiments, the amplification through the transmit or receive signal paths may be done solely in the RF circuitry 606, solely in the FEM circuitry 608, or in both the RF circuitry 606 and the FEM circuitry 608.

In some embodiments, the FEM circuitry 608 may include a TX/RX switch to switch between transmit mode and receive mode operation. The FEM circuitry 608 may include a receive signal path and a transmit signal path. The receive signal path of the FEM circuitry 608 may include an LNA to amplify received RF signals and provide the amplified received RF signals as an output (e.g., to the RF circuitry 606). The transmit signal path of the FEM circuitry 608 may include a power amplifier (PA) to amplify input RF signals (e.g., provided by RF circuitry 606), and one or more filters to generate RF signals for subsequent transmission by one or more antenna elements of the antenna array 620.

The antenna array 620 comprises one or more antenna elements, each of which is configured convert electrical signals into radio waves to travel through the air and to convert received radio waves into electrical signals. For example, digital baseband signals provided by the baseband circuitry 610 is converted into analog RF signals (e.g., modulated waveform) that will be amplified and transmitted via the antenna elements of the antenna array 620 including one or more antenna elements (not shown). The antenna elements may be omnidirectional, direction, or a combination thereof. The antenna elements may be formed in a multitude of arranges as are known and/or discussed herein. The antenna array 620 may comprise microstrip antennas or printed antennas that are fabricated on the surface of one or more printed circuit boards. The antenna array 620 may be formed in as a patch of metal foil (e.g., a patch antenna) in a variety of shapes, and may be coupled with the RF circuitry 606 and/or FEM circuitry XT108 using metal transmission lines or the like.

Figure 7:
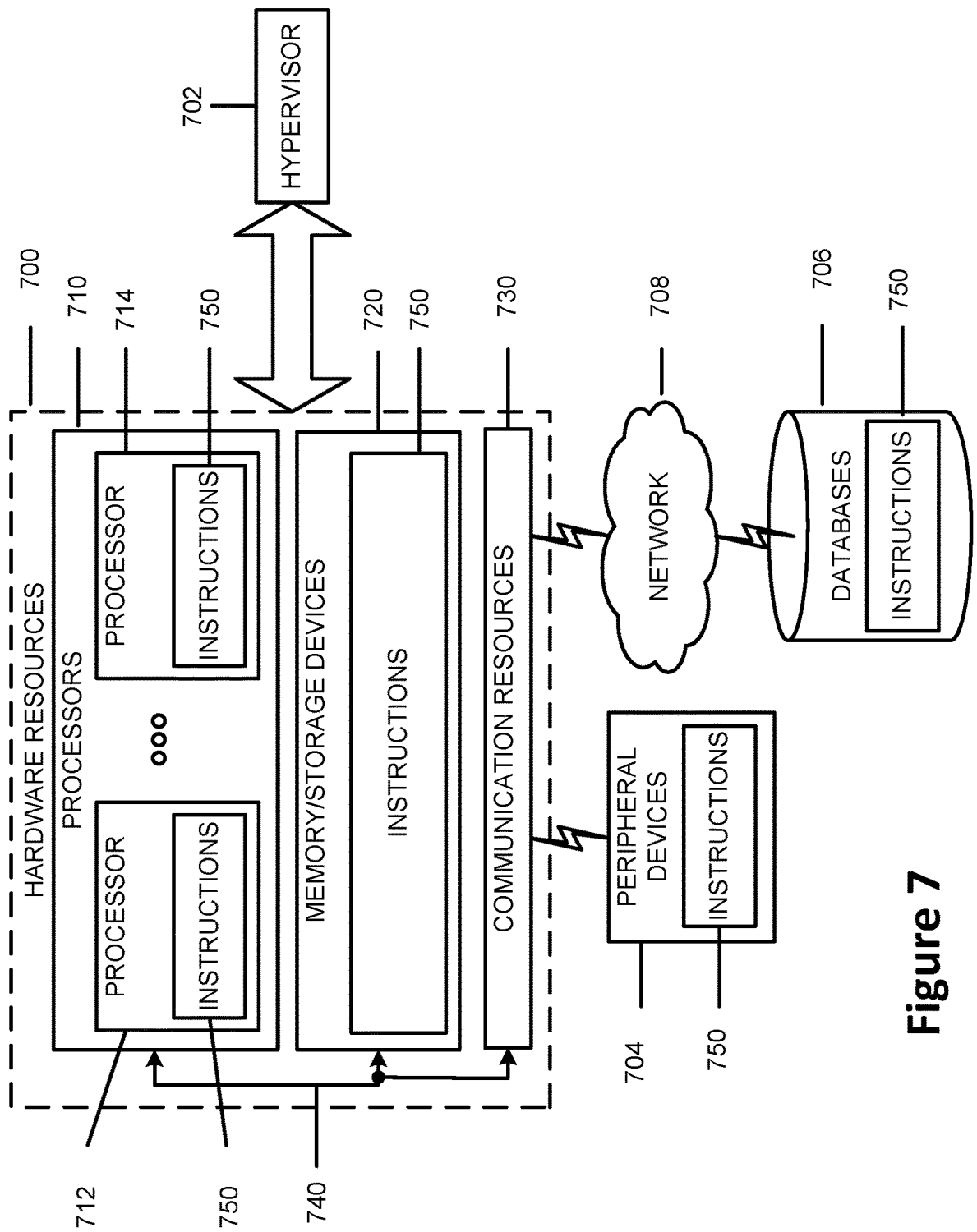
FIG. 7 is a block diagram illustrating components, according to some example embodiments, able to read instructions from a machine-readable or computer-readable medium (for example, a non-transitory machine-readable storage medium) and perform any one or more of the methodologies discussed herein.

FIG. 7 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 7 shows a diagrammatic representation of hardware resources 700 including one or more processors (or processor cores) 710, one or more memory/storage devices 720, and one or more communication resources 730, each of which may be communicatively coupled via a bus 740. As used herein, the term "computing resource," "hardware resource," etc., may refer to a physical or virtual device, a physical or virtual component within a computing environment, and/or a physical or virtual component within a particular device, such as computer devices, mechanical devices, memory space, processor/CPU time and/or processor/CPU usage, processor and accelerator loads, hardware time or usage, electrical power, input/output operations, ports or network sockets, channel/link allocation, throughput, memory usage, storage, network, database and applications, and/or the like. For embodiments where node virtualization (e.g., NFV) is utilized, a hypervisor 702 may be executed to provide an execution environment for one or more network slices/sub-slices to utilize the hardware resources 700. A "virtualized resource" may refer to compute, storage, and/or network resources provided by virtualization infrastructure to an application, device, system, etc.

The processors 710 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 712 and a processor 714.

The memory/storage devices 720 may include main memory, disk storage, or any suitable combination thereof. The memory/storage devices 720 may include, but are not limited to, any type of volatile or nonvolatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 730 may include interconnection or network interface components or other suitable devices to communicate with one or more peripheral devices 704 or one or more databases 706 via a network 708. For example, the communication resources 730 may include wired communication components (e.g., for coupling via a universal serial bus (USB)), cellular communication components, NFC components, Bluetooth® components (e.g., Bluetooth® Low Energy), Wi-Fi® components, and other communication components. As used herein, the term "network resource" or "communication resource" may refer to computing resources that are accessible by computer devices via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

Instructions 750 may comprise software, a program, an application, an applet, an app, or other executable code for causing at least any of the processors 710 to perform any one or more of the methodologies discussed herein. The instructions 750 may reside, completely or partially, within at least one of the processors 710 (e.g., within the processor's cache memory), the memory/storage devices 720, or any suitable combination thereof. Furthermore, any portion of the instructions 750 may be transferred to the hardware resources 700 from any combination of the peripheral devices 704 or the databases 706. Accordingly, the memory of processors 710, the memory/storage devices 720, the peripheral devices 704, and the databases 706 are examples of computer-readable and machine-readable media.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

Examples

Example 1 includes a method of operating a UE, the method comprising: determining whether same spatial relation information is configured for each sounding reference signal (SRS) resource in a set of SRS resources; selecting a spatial transmission filter based on said determination whether the same spatial relation information is configured for each SRS resource in the set of SRS resources; and causing an uplink transmission to be transmitted with the spatial transmission filter.

Example 2 includes the method of example 1 or some other example herein, wherein the spatial transmission filter is for a first SRS resource and is correlated with a spatial domain filter of spatial relation information for the first SRS resource if it is determined that the same spatial relation information is configured for each SRS resource in the set of SRS resources.

Example 3 includes the method of example 1 or some other example herein, wherein the spatial transmission filter is for a first SRS resource and is indicated by spatial relation information for the first SRS resource if it is determined that the same spatial relation information is not configured for each SRS resource in the set of SRS resources.

Example 4 includes the method of example 1 or some other example herein, further comprising providing, to a radio access node, an indication that the UE supports partial beam correspondence.

Example 5 includes the method of example 4 or some other example herein, wherein the indication is in a UE capability message.

Example 6 includes the method of example 1 or some other example herein, further comprising: determining the same spatial relation information is configured for a subset of SRS resources of the set of SRS resources, wherein the spatial transmission filter is for the subset of SRS resources and is correlated with a spatial domain filter indicated by the same spatial relation information configured for the subset of SRS resources.

Example 7 includes the method of example 6 or some other example herein, further comprising: determining a first SRS resource of the set of SRS resources is configured with first spatial relation information that differs from the same spatial relation information configured for the subset of SRS resources; and selecting a first spatial transmission filter indicated by the first spatial relation information for transmission of the first SRS resource.

Example 8 includes the method of example 6 or some other example herein, further comprising: determining a first SRS resource of the set of SRS resources is configured with first spatial relation information that differs from the same spatial relation information configured for the subset of SRS resources; and selecting a first spatial transmission filter that is correlated with a spatial domain filter indicated by the first spatial relation information for transmission of the first SRS resource.

Example 9 includes a method comprising: receiving spatial relation information for individual sounding reference signal (SRS) resources in a set of SRS resources; determining, based on the spatial relation information, a first beam configured for a first SRS resource; and selecting the first beam or a second beam, which is correlated with the first beam, for transmission of the first SRS resource based on whether at least a plurality of SRS resources of the set of SRS resources are configured with a common beam.

Example 10 includes the method of example 9 or some other example herein, further comprising transmitting the first SRS resource using the first beam.

Example 11 includes the method of example 9 or some other example herein, further comprising: determining, based on the spatial relation information, all of the SRS resources in the set of SRS resources are configured with the common beam; and selecting the second beam for transmission of the first SRS resource based on said determination that all of the SRS resources in the set of SRS resources are configured with the common beam.

Example 12 includes the method of example 9 or some other example herein, further comprising: determining, based on the spatial relation information, all of the SRS resources in the set of SRS resources are configured with different beams; and selecting the first beam for transmission of the first SRS resource based on said determination that all of the SRS resources in the set of SRS resources are configured with different beams.

Example 13 includes the method of example 9 or some other example herein, further comprising: determining a subset of the SRS resources of the set of SRS resources are configured with the common beam, wherein the subset does not include the first SRS resource and the first beam is different from the common beam; and selecting the first beam for transmission of the first SRS resource based on the subset not including the first SRS resource.

Example 14 includes the method of example 9 or some other example herein, further comprising: determining a subset of the SRS resources of the set of SRS resources are configured with the common beam, wherein the subset includes the first SRS resource and the first beam is the common beam; and selecting a first beam for transmission of the first SRS resource based on the subset including the first SRS resource.

Example 15 includes the method of any one of examples 9-14 or some other example herein, further comprising providing, to a radio access node, an indication that a user equipment (UE) supports partial beam correspondence.

Example 16 includes the method of example 15 or some other example herein, wherein the indication is in a UE capability message.

Example 17 includes a method of operating a UE, the method comprising: determining a value K; sequentially transmitting a sounding reference signal (SRS) resource with a plurality of spatial domain filters; receiving control signaling from an access node, the control signaling to include a transmission configuration indication (TCI) with a state that indicates the SRS resource; selecting a spatial domain filter of the plurality of spatial domain filter that was used to transmit a latest transmission of the SRS resource at least K slots or symbols before reception of the downlink signal; and using the spatial domain filter or a filter correlated to the spatial domain filter to receive communications from the access node.

Example 18 includes the method of example 17 or some other example herein, further comprising receiving the TCI for reception of a downlink signal that is a physical downlink control channel, a physical downlink shared channel, or a channel state information—reference signal.

Example 19 includes the method of example 17 or some other example herein, wherein K is based on a capability of the UE.

Example 20 includes the method of example 18 or some other example herein, further comprising: determining a type or configuration of the downlink signal; and using the spatial domain filter or the filter correlated to the spatial domain filter based on the type or configuration of the downlink signal.

Example 21 may include an apparatus comprising means to perform one or more elements of a method described in or related to any of examples 1-20, or any other method or process described herein.

Example 22 may include one or more non-transitory computer-readable media comprising instructions to cause an electronic device, upon execution of the instructions by one or more processors of the electronic device, to perform one or more elements of a method described in or related to any of examples 1-20, or any other method or process described herein.

Example 23 may include an apparatus comprising logic, modules, or circuitry to perform one or more elements of a method described in or related to any of examples 1-20, or any other method or process described herein.

Example 24 may include a method, technique, or process as described in or related to any of examples 1-20, or portions or parts thereof.

Example 25 may include an apparatus comprising: one or more processors and one or more computer readable media comprising instructions that, when executed by the one or more processors, cause the one or more processors to perform the method, techniques, or process as described in or related to any of examples 1-20, or portions thereof.

Example 26 may include a signal as described in or related to any of examples 1-20, or portions or parts thereof.

Example 27 may include a signal in a wireless network as shown and described herein.

Example 28 may include a method of communicating in a wireless network as shown and described herein.

Example 29 may include a system for providing wireless communication as shown and described herein.

Example 30 may include a device for providing wireless communication as shown and described herein.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

What is claimed is:

1. One or more non-transitory computer-readable media having instructions that, when executed by one or more processors, cause a user equipment (UE) to:
read spatial relation information for each sounding reference signal (SRS) resource in a SRS resource set;
determine that a subset of SRS resources in the SRS resource set is configured with same spatial relation information;
select a correlated spatial domain filter for the subset of SRS resources that is correlated with a spatial domain filter indicated by the spatial relation information configured for the subset of SRS resources; and
cause an uplink transmission to be transmitted with the correlated spatial domain filter.

2. The one or more non-transitory computer-readable media of claim 1, wherein the correlated spatial domain filter is for a first SRS resource and is correlated with the spatial domain filter indicated by the spatial relation information for the first SRS resource if it is determined that the same spatial relation information is configured for each SRS resource in the subset of SRS resources.

3. The one or more non-transitory computer-readable media of claim 1, wherein the instructions that, when executed by one or more processors, further cause the UE to select the spatial domain filter indicated by the spatial relation information if it is determined that the same spatial relation information is not configured for each SRS resource in the subset of SRS resources.

4. The one or more non-transitory computer-readable media of claim 1, wherein the instructions, when executed by the one or more processors, further cause the UE to provide, to a radio access node, an indication that the UE supports partial beam correspondence.

5. The one or more non-transitory computer-readable media of claim 4, wherein the indication is included within a UE capability message.

6. The one or more non-transitory computer-readable media of claim 1, wherein the instructions, when executed by the one or more processors, further cause the UE to:
determine a SRS resource of the set of SRS resources that is configured with the spatial relation information that differs from the same spatial relation information that is configured for each SRS resource in the subset of SRS resources; and
select the spatial domain filter indicated by the spatial relation information for transmission of the SRS resource.

7. The one or more non-transitory computer-readable media of claim 1, wherein the instructions, when executed by the one or more processors, further cause the UE to:
determine a SRS resource of the set of SRS resources that is configured with the spatial relation information that is the same as the same spatial relation information that is configured for each SRS resource in the subset of SRS resources; and
select the correlated spatial domain filter that is correlated with the spatial domain filter indicated by the first spatial relation information for transmission of the first SRS resource.

8. An apparatus, comprising:
beamforming circuitry; and
processing circuitry, coupled with the beamforming circuitry, configured to:
read spatial relation information configured for a set of sounding reference signal (SRS) resources;
determine, based on the spatial relation information, whether same spatial relation information is configured for each SRS resource in a subset of SRS resources of the set of SRS resources; and
select a correlated spatial domain filter that is correlated with a spatial domain filter indicated by the spatial relation information based on the same spatial relation information being configured for each SRS resource in the subset of SRS resources.

9. The apparatus of claim 8, wherein the processing circuitry is further configured to control the beamforming circuitry to transmit an uplink transmission using the correlated spatial domain filter.

10. The apparatus of claim 8, wherein the processing circuitry is further configured to:
determine, based on the spatial relation information, all of the SRS resources in the set of SRS resources are configured with the same spatial relation information; and
select the correlated spatial domain filter based on said determination that all of the SRS resources in the set of SRS resources are configured with the same spatial relation information for transmission of all of the SRS resources.

11. The apparatus of claim 8, wherein the processing circuitry is further configured to:
determine, based on the spatial relation information, all of the SRS resources in the set of SRS resources are not configured with the same spatial relation information; and
select the spatial domain filter indicated by the spatial relation information based on said determination that all of the SRS resources in the set of SRS resources are not configured with the same spatial relation information for transmission of all of the SRS resources.

12. The apparatus of claim 8, wherein the processing circuitry is further configured to:
determine a SRS resource of the set of SRS resources that is configured with the spatial relation information that differs from the same spatial relation information that is configured for each SRS resource in the subset of SRS resources; and
select the spatial domain filter indicated by the spatial relation information for transmission of the SRS resource.

13. The apparatus of claim 8, wherein the processing circuitry is further configured to:
determine a SRS resource of the set of SRS resources that is configured with the spatial relation information that is the same as the same spatial relation information that is configured for each SRS resource in the subset of SRS resources; and
select the correlated spatial domain filter that is correlated with the spatial domain filter indicated by the spatial relation information for transmission of the SRS resource.

14. The apparatus of claim 8, wherein the processing circuitry is further configured to:
provide, to an access node, an indication that a user equipment (UE) supports partial beam correspondence.

15. The apparatus of claim 14, wherein the indication is included within a UE capability message.

16. One or more non-transitory computer-readable media having instructions that, when executed by one or more processors, cause a user equipment (UE) to:
  determine a value K;
  sequentially transmit a sounding reference signal (SRS) resource with a plurality of spatial domain filters;
  receive control signaling from an access node, the control signaling to include a transmission configuration indication (TCI) with a state that indicates the SRS resource;
  select a spatial domain filter of the plurality of spatial domain filters that was used to transmit a latest transmission of the SRS resource at least K slots or symbols before reception of a downlink signal; and
  use the spatial domain filter or a filter correlated to the spatial domain filter to receive communications from the access node.

17. The one or more non-transitory computer-readable media of claim 16, wherein the instructions, when executed, further cause the UE to:
  receive the TCI for the reception of the downlink signal that is a physical downlink control channel, a physical downlink shared channel, or a channel state information-reference signal.

18. The one or more non-transitory computer-readable media of claim 17, wherein the instructions, when executed, further cause the UE to:
  determine a type or configuration of the downlink signal; and
  use the spatial domain filter or the filter correlated to the spatial domain filter based on the type or configuration of the downlink signal.

19. The one or more non-transitory computer-readable media of claim 16, wherein the control signaling is downlink control information, radio resource control signaling, or a media access control-control element.

* * * * *

UNITED STATES PATENT AND TRADEMARK OFFICE
CERTIFICATE OF CORRECTION

PATENT NO. : 12,021,773 B2  
APPLICATION NO. : 17/292312  
DATED : June 25, 2024  
INVENTOR(S) : Davydov et al.

Page 1 of 1

It is certified that error appears in the above-identified patent and that said Letters Patent is hereby corrected as shown below:

In the Claims

In Column 19, Claim 7, Line 65, delete "the first" and insert -- the --, therefor.

In Column 19, Claim 7, Line 66, delete "the first" and insert -- the --, therefor.

Signed and Sealed this  
Thirtieth Day of July, 2024

Katherine Kelly Vidal  
*Director of the United States Patent and Trademark Office*